Patented June 29, 1948

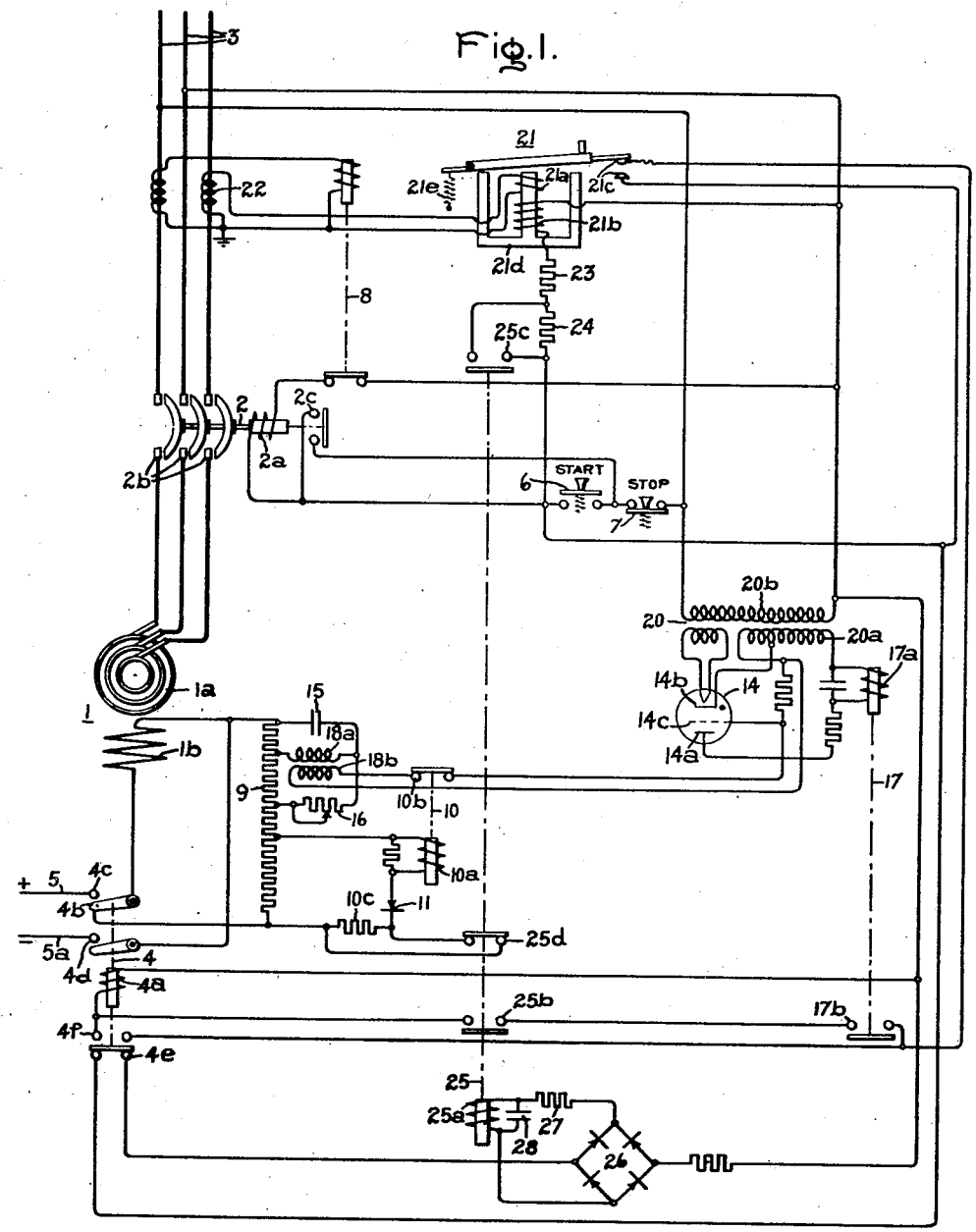

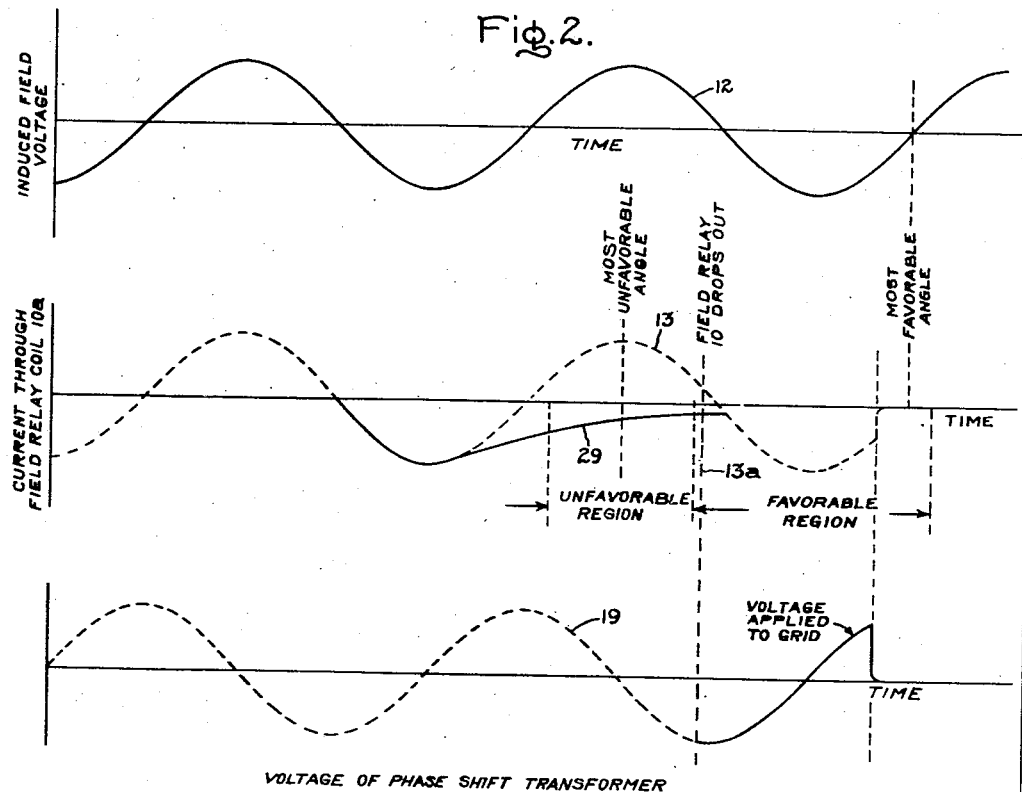
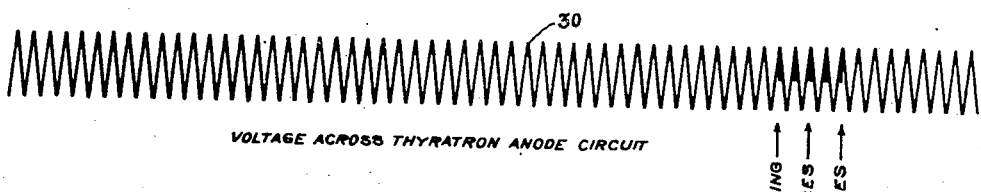

2,444,253

UNITED STATES PATENT OFFICE 2,444,253

SYNCHRONOUS MOTOR CONTROL SYSTEM

Gerhart W. Heumann and Robert B. Taylor, Schenectady, N. Y., assignors to General Electric Company, a corporation of New York Application January 29, 1947, Serial No. 725,014

5 Claims. (Cl. 318—176)

This invention relates to control systems, more particularly to systems for controlling the operation of synchronous motors and it has for an object the provision of a simple, reliable and inexpensive control system of this character.

A more specific object of the invention is the provision of an improved control system for connecting the field winding of a synchronous motor to a source of excitation when the motor attains substantially synchronous speed during its starting operation, for disconnecting the motor field winding from the source of excitation when the motor pulls out of synchronism, and for reestablishing the connection of the motor field winding to the source of excitation when the motor speed again attains substantially synchronous value.

For a better and more complete understanding of the invention, reference should now be had to the following specification and to the accompanying drawings of which Fig. 1 is a simple, diagrammatic sketch of an embodiment of the invention, and Fig. 2 is a chart of characteristic curves which facilitate an understanding of the invention.

Referring now to the drawings, the armature 1a of a synchronous motor 1 is arranged to be connected by means of a contactor 2 to a suitable source of alternating voltage such as represented by the supply lines 3, and the field winding 1b is arranged to be connected by means of a suitable switching device such as the field contactor 4 to a suitable source of substantially constant direct voltage which is represented by the two supply lines 5 and 5a. The conductor 5 is assumed to be the positive terminal of the line and the conductor 5a is assumed to be the negative terminal.

For the purpose of opening and closing the line switch contactor 2, suitable start and stop switching devices 6 and 7 are provided. The start device 6 is illustrated as a push button type switch having normally open contacts, and the stop device 7 is illustrated as a push button type switch having normally closed contacts. The normally open and normally closed contacts of these devices are connected in the circuit of the operating coil 2a of the line contactor.

In order to disconnect the motor 1 from the supply circuit 3 in response to short circuit or overload conditions in the motor armature, a suitable overload responsive device 8 is provided for opening the circuit of the operating coil 2a.

A discharge resistor 9 is provided for the field winding. It is connected across the winding by the normally closed contacts 4b of the field contactor. The normally open contacts 4c and 4d serve to connect the field winding to the source 5, 5a when the field contactor is picked up.

A suitable speed responsive means is provided for controlling the energization of the operating coil 4a of the field contactor when the motor attains substantially synchronous speed. This means is illustrated as comprising a relay 10 of which the operating coil 10a is connected to the motor field circuit through a rectifying device 11. Although the rectifying device may be of any suitable type, it is preferably of the surface contact type such as the well known copper oxide rectifier. The rectifier and the operating coil 10a are connected in series across any selected portion or all of the discharge resistor 9. When the motor is operating at subsynchronous speeds, an alternating voltage of slip frequency is induced in the field winding. This slip frequency alternating voltage is represented in Fig. 2 by the sinusoidal curve 12. The rectifier 11 is poled to rectify the negative half cycle of this voltage. With this arrangement the induced current which flows in the circuit of the operating coil 10a causes the relay to pick up and open its contacts 10b and to maintain them open until the motor attains a speed which is a few per cent below synchronous speed, e. g. 1 to 5 per cent slip. At this speed the frequency of the induced voltage is so low that the portion of each slip cycle during which the rectifier permits substantially no current to flow through the relay winding is sufficiently long to allow the relay to become demagnetized and to drop out and close its normally closed contacts.

There are certain angles or areas of angular relationships of the field poles relative to the poles of the rotating magnetic field which are favorable to synchronization of the motor and certain areas of angular relationships which are unfavorable to synchronization. The relationship of these favorable and unfavorable areas is illustrated by references on the curve 13 of Fig. 2 which represents the slip frequency voltage and is similar to the curve 12.

For the purpose of effecting pick up of the field contactor at an angle which is favorable for synchronization, suitable means are provided. These means are illustrated as comprising an electric valve 14, a phase shifting circuit comprising capacitor 15 and resistor 16 and a control relay 17 having its operating coil 17a connected in the output circuit of the valve and its contacts 17b connected in circuit with the operating coil 4a of the field contactor.

The phase shifting circuit is connected across a portion of the discharge resistor 9. For the purpose of deriving a voltage from the phase shifting circuit having a predetermined phase relationship to the slip voltage, the primary winding 18a of a transformer is connected between an intermediate point of the discharge resistor and the junction point of the capacitor 15 and resistor 16. The phase relationship between the slip frequency voltage and the voltage induced in the secondary winding 18b of the phase shift transformer is represented in Fig. 2 by the phase relationship of the sinusoidal curves 13 and 19. The curve 19 represents the voltage induced in the secondary winding 18b of the transformer. By adjusting the resistor 16 of the phase shifting circuit the phase relationship between the transformer voltage and the slip frequency voltage can be adjusted over a wide range. Preferably it is adjusted to a value at which the transformer secondary voltage lags the induced field voltage by an angle between 180 and 270 degrees.

The electric valve 14 is preferably a thyratron. It is provided with an anode 14a, a cathode 14b and a control grid 14c and a suitable amount of mercury vapor or other gas is introduced into the envelope after exhaust.

The anode-cathode or output circuit of thyratron 14 is supplied with alternating voltage from the secondary winding 20a of a transformer 20 of which the primary winding 20b is connected to a suitable source of commercial frequency such as one phase of the supply source 3. The circuit is traced from one terminal of the secondary winding through the operating coil 17a of the control relay to the anode 14a of the thyratron and from the cathode 14b of the thyratron to an intermediate point on the secondary winding 20a. As shown, the grid 14c of the thyratron is connected to the terminal of the secondary winding of which the voltage is negative when the anode voltage is positive. The negative voltage applied to the grid when the contacts 10b are opened is sufficient to bias the thyratron to cut off.

For the purpose of deenergizing the field winding 1b in the event the motor pulls out of synchronism, a pull out relay 21 is provided. This pull out relay is preferably a power factor relay. It has a current coil 21a which is connected to the secondary winding of a current transformer 22 of which the primary winding is energized by the current flowing in one of the phases of the armature of the motor. It also has a voltage coil 21b which is connected through resistors 23 and 24 and the contacts of start switch 6 and stop switch 7 across the remaining two phases of the supply source. The relay 21 is also provided with a pair of contacts 21c which are connected in the circuit of the operating coil 4a of the field contactor.

The relay is provided with an E-shaped core structure 21d which is biased to the drop out position by means of a spring 21e. The voltage coil and the current coil are both mounted on the same leg of the E-shaped core structure and preferably on the center leg. If the magnetomotive forces of the two coils are in phase and tending to send flux in the same direction, and further if the voltage and current supplied to the motor have sufficient magnitudes, the relay will pick up. As the phase angle between these magnetomotive forces changes owing to a change in the phase angle between the current in the coil 21a and the current in coil 21b the magnetomotive forces tend to buck each other and the relay will trip at a phase angle of the motor voltage and current which is indicative of the motor having pulled out of synchronism.

The combined resistance of the resistors 23 and 24 is preferably several times larger than the impedance of the coil 21b. In one case which is typical the combined resistance of resistors 23 and 24 is approximately three times the impedance of the coil 21b and the resistance of resistor 24 is two thirds of the combined resistance of both resistors. Thus, if the resistor 24 is short circuited, approximately twice normal current flows in the voltage coil 21b. Consequently, the voltage coil overwhelms the current coil and the relay is picked up irrespective of the power factor angle between the voltage and current of the motor.

In order to introduce suitable time interval in the sequence of operations, a time interval relay 25 is provided. It has an operating coil 25a, normally open contacts 25b in circuit with the operating coil 4a of the field contactor, normally open contacts 25c connected across the resistor 24 and normally closed contacts 25d which normally short circuit the resistor in circuit with the operating coil 10a of the field application relay 10. The operating coil 25a is supplied with direct voltage from a suitable source such as the full wave copper-oxide rectifier 26 of which the input terminals are connected across one phase of the alternating voltage supply source. Time delay in the pickup and drop out operations of the relay is provided by means of copper jacketing or by other means such as a resistor 27 in series with the operating coil and a capacitor 28 in parallel with the operating coil.

With the foregoing understanding of the elements and their organization the operation of the system will be readily understood from the following detailed description.

To start the motor the start push button switch 6 is depressed to complete an energizing circuit for the operating coil 2a of the line contactor. In response to energization the line contactor closes its main contacts 2b to connect the armature winding of the motor to the supply source 3. It also closes its auxiliary contacts 2c to complete a locking circuit for the operating coil in parallel with the contacts of the start switch which may now be released without deenergizing the line contactor.

Owing to the connection of the armature to the alternating voltage supply, an alternating voltage of slip frequency is induced in the field winding 1b of the motor. Since the field contactor 4 is denergized, its contacts 4b are closed and the discharge resistor 9 is connected across the field winding 1b. Consequently, the slip frequency alternating voltage appears across the discharge resistor and the operating coil 10a of the field application relay 10 is energized. In response to energization it picks up and opens its normally closed contacts 10b in the input circuit of the thyratron 14 thereby biasing the thyratron to cut off.

The closing of the contacts of the start switch 6 completes the input circuit to the recifier 26 so that a rectified voltage is supplied to the operating coil 25a of the time delay relay. After an interval of time this relay picks up and closes its normally open contacts 25b and 25c and opens its normally closed contacts 25d. In closing, contacts 25c short circuit the resistor 24 so that double normal current flows in the voltage coil 21b of the power factor relay. In response to this excessive energization of the voltage coil, the power factor relay picks up and closes its normally open contacts 21c and maintains these contacts closed during the starting operation regardless of the magnitude or power factor of the armature current of the motor. The normally open contacts 25b in closing cooperate with the contacts 25c to prepare an energizing circuit for the operating coil 4a of the field contactor. The time interval between closing of the start switch and closing of contacts 25b and 21c is sufficient to permit the field application relay 10 to open its contacts 10b and thereby prevent premature closing of the field contactor 4 and application of field to the motor prior to its acceleration to minimum slip.

The contacts 25d in opening insert the resistor 10c in series with the operating coil 10a of the field application relay. Once the resistor 10c is inserted, the field application relay cannot pick up again after it drops out at minimum slip until a field application and removal cycle has been completed.

The motor now accelerates as an induction motor. As the acceleration proceeds the intervals between negative half cycles of the voltage induced in the field winding increase in length. Owing to the inductance of the coil 10a, current continues to flow in the coil circuit during the positive half cycle. This condition is illustrated in Fig. 2 by the curve 29 which represents current in the relay coil circuit. At the condition of minimum slip the value of the coil current becomes so low near the end of a positive half cycle that it drops out and closes its normally closed contacts 10b. The drop out point of the relay near the end of the positive half cycle of the voltage induced in field winding is represented by the intersection of the vertical line 13a in Fig. 2 with the sinusoidal curve 13. The closing of contacts 10b applies the voltage induced in the secondary winding 18b of the phase shift transformer to the grid or input circuit of the thyratron. In Fig. 2 the intersection of the vertical line 13a with the sinusoidal curve 19 represents the instant of application of the phase shift transformer voltage to the input circuit of the thyratron. At this instant the voltage applied to the grid is negative and consequently the thyratron does not fire.

As pointed out in the foregoing, a voltage of line frequency is supplied to the anode-cathode circuit of the thyratron during the starting period. This voltage of line frequency is represented by the sinusoidal curve 30 in Fig. 2.

As the grid voltage swings through zero into the next half cycle in which it is positive with respect to the voltage of the cathode the thyratron fires and rectified current pulses at line frequency pass through the operating coil 17a of the control relay. These rectified current pulses are represented by the shaded positive half cycles of the alternating voltage 30. After approximately two cycles of the alternating voltage supplied to the thyratron the relay 17 picks up and closes its contacts 17b thereby completing the energizing circuit for the operating coil 4a of the field contactor. After approximately two more cycles the field contactor closes its contacts 4c and 4d to connect the field winding 1b to the direct voltage source 5, 5a, and substantially simultaneously therewith it opens its normally closed contact 4b to disconnect the field winding from the discharge resistor 9.

As shown in Fig. 2, the instant at which the field contactor closes to apply field to the motor occurs at an angle which is slightly ahead of the most favorable angle for applying the field. However, the instant of field application is well within the desirable range.

In picking up, the field contactor 4 also opens its normally closed contacts 4e and closes its normally open contacts 4f to disconnect the rectifier 26 from the source and thereby deenergize the operating coil of the timing relay 25. After a predetermined interval of time, the timing relay drops out and opens its normally open contacts 25b and 25c. The opening of the contacts 25b does not interrupt the energizing circuit of the field contactor since these contacts are short circuited by the contacts 4f of the field contactor. Contacts 25c in opening insert the resistor 24 in circuit with the voltage coil 21b of the power factor relay thereby reducing its energization to the normal value and transferring control of the field contactor to the power factor relay. The time interval during which the contacts 25c remain closed after the application of field to the motor is of sufficient duration to prevent the power factor relay from opening its contacts 21c to effect field removal.

If the motor pulls out of synchronism the power factor undergoes a significant change during the first slip cycle. If such a pull out occurs after the control of the field contactor has been transferred to the power factor relay by the opening of contacts 25c, the power factor relay then opens its contacts 21c and drops out the field contactor 4. As a result, field is removed and the control system is left in a reset condition to repeat the synchronizing cycle. The closing of the normally open contacts 4e of the field contactor in response to drop out reconnects the rectifier 26 to the supply source and energizes the operating coil 25a of the time delay relay to initiate another synchronizing cycle. However, the time delay relay 25 prevents the resynchronization of the motor for a time interval following field removal.

At any time during the operation the motor can be stopped by depressing the stop switch 7 to open its contacts thereby to interrupt the energizing circuits for the operating coils of the line contactor 2 and the field contactor 4 which drop out in response to deenergization and disconnect the armature from the line and the field winding from the direct voltage source.

Although in accordance with the provisions of the Patent Statutes this invention is described as embodied in concrete form and the principle thereof has been explained together with the best mode in which it is now contemplated applying that principle, it will be understood that the elements shown and described are merely illustrative and that the invention is not limited thereto since alterations and modifications will readily suggest themselves to persons skilled in the art without departing from the true spirit of this invention or from the scope of the annexed claims.

What we claim as new and desire to secure by Letters Patent of the United States, is:

1. A control system for a synchronous motor having a field winding comprising a contactor for controlling the excitation of said field winding, a start control switching device, a control relay having time delay pick up and time delay drop out, a second control relay having a first pair of contacts and operable in response to a condition indicative of the motor pulling out of synchronism for opening said contacts and responsive to the pick up operation of said time delay relay for closing said contacts, a second pair of contacts closed in response to said pick up operation of said time delay relay and cooperating with said first pair of contacts to prepare an energizing circuit for said field contactor, means controlled by the speed of the motor for controlling the completion of said energizing circuit to effect operation of said contactor, and means responsive to operation of said field contactor to complete a circuit bypassing said second pair of contacts and to deenergize said time delay relay to transfer control of the energizing circuit of said field contactor to said second control relay.

2. A control system for a synchronous motor having an armature winding and a field winding comprising a contactor for controlling the excitation of said field winding, a start control switching device, a control relay responsive to operation of said start device having time delay pick up and time delay drop out, a power factor relay provided with a voltage coil and a current coil connected to be energized by the voltage and current of said armature winding and responsive to a condition indicative of the motor falling out of synchronism for opening its contacts, a resistor connected in circuit with said voltage coil, second contacts responsive to said pick up operation of said control relay for short circuiting said resistor and causing said power factor relay to close its contacts, third contacts closed in response to said pick up operation for cooperating with said power factor relay contacts to prepare an energizing circuit for said contactor, and means responsive to the speed of the motor for controlling the completion of said energizing circuit to effect operation of said field contactor.

3. A control system for a synchronous motor having an armature winding and a field winding comprising a contactor for controlling the excitation of said field winding, a start control switching device, a control relay responsive to operation of said start device having time delay pick up and time delay drop out, a power factor relay provided with a voltage coil and a current coil connected to be energized by the voltage and current of said armature winding and responsive to a condition indicative of the motor falling out of synchronism for opening its contacts, a resistor connected in circuit with said voltage coil, second contacts responsive to said pick up operation of said control relay for short circuiting said resistor and causing said power factor relay to close its contacts, third contacts closed in response to said pick up operation for cooperating with said power factor relay contacts to prepare an energizing circuit for said contactor, means responsive to the speed of the motor for controlling the completion of said energizing circuit to effect operation of said field contactor, and means responsive to operation of said field contactor for bypassing said third contacts and to deenergize said time delay relay to open said second contacts and said third contacts to transfer control of said energizing circuit to said power factor relay at the expiration of said time delay drop out.

4. A control system for a synchronous motor having an armature winding and a field winding, a discharge resistor, a contactor having normally closed contacts for connecting said field winding to said resistor and normally open contacts for controlling the excitation of said field winding, a start control device, means responsive to operation of said start device for connecting said armature winding to a source of alternating voltage, means responsive to operation of said start device for preparing an energizing circuit for said field contactor, a phase shifting circuit for deriving an alternating voltage having a predetermined phase relationship to the voltage induced in said field winding, an electric valve having an anode-cathode circuit supplied from said source and a control grid, means responsive to the speed of said motor for connecting the grid cathode circuit to said phase shifting circuit during a negative half cycle of said derived voltage to effect conduction of said valve at a phase angle of said induced voltage favorable for synchronizing said motor, and a relay responsive to conduction of said electric valve for completing said energizing circuit to close said normally open contacts of said field contactor.

5. A control system for a synchronous motor having a field winding comprising a contactor for controlling the excitation of said field winding, a start control switching device, a control relay responsive to operation of said start device and having time delay pick up and time delay drop out, a relay responsive to a condition indicative of the motor pulling out of synchronism and provided with an operating coil, contacts controlled by the pick up operation of said control relay for effecting pick up of said pull out relay, additional contacts responsive to pick up operation of said control relay cooperating with the contacts of said pull out relay to prepare an energizing circuit for said field contactor, and means for completing said energizing circuit comprising electric valve apparatus, means adapted to be controlled by the speed of the motor for controlling the energization of said valve apparatus and a third relay responsive to the energization of said valve apparatus.

GERHART. W. HEUMANN.
ROBERT B. TAYLOR.

REFERENCES CITED

The following references are of record in the file of this patent:

UNITED STATES PATENTS

| Number | Name | Date |
|---|---|---|
| 2,151,178 | Anderson | Mar. 21, 1939 |
| 2,269,972 | Halberg | Jan. 13, 1942 |
| 2,313,528 | Ewing et al. | Mar. 9, 1943 |